United States Patent
Wen et al.

(10) Patent No.: US 12,292,845 B2
(45) Date of Patent: May 6, 2025

(54) METHODS AND SYSTEMS FOR ESTABLISHING DIRECT COMMUNICATIONS BETWEEN A SERVER COMPUTER AND A SMART NETWORK INTERFACE CONTROLLER

(71) Applicant: VMware LLC, Palo Alto, CA (US)

(72) Inventors: Chengjian Wen, Beijing (CN); Qin Li, Beijing (CN); Hao Huang, Beijing (CN); Shu Wu, Beijing (CN)

(73) Assignee: VMWare LLC, Palo Alto, CA (US)

( * ) Notice: Subject to any disclaimer, the term of this patent is extended or adjusted under 35 U.S.C. 154(b) by 0 days.

(21) Appl. No.: 17/669,272

(22) Filed: Feb. 10, 2022

(65) Prior Publication Data
US 2023/0214337 A1    Jul. 6, 2023

(30) Foreign Application Priority Data
Jan. 6, 2022 (WO) ................ PCT/CN2022/070472

(51) Int. Cl.
G06F 13/28 (2006.01)

(52) U.S. Cl.
CPC .......... G06F 13/28 (2013.01); *G06F 2213/28* (2013.01)

(58) Field of Classification Search
CPC .......... G06F 12/0802; G06F 2212/401; G06F 2212/60; H03M 7/60
See application file for complete search history.

(56) References Cited

U.S. PATENT DOCUMENTS

| | | | |
|---|---|---|---|
| 8,397,306 B1* | 3/2013 | Tormasov | G06F 21/00 713/166 |
| 10,228,968 B2* | 3/2019 | Stark | G06F 12/109 |
| 10,366,024 B2* | 7/2019 | Craddock | G06F 12/1027 |
| 10,853,277 B2* | 12/2020 | Liang | G06F 13/28 |
| 11,409,685 B1* | 8/2022 | Kaplan | H04L 67/1095 |
| 11,416,435 B2* | 8/2022 | Raman | G06F 13/128 |
| 2018/0152540 A1* | 5/2018 | Niell | G06F 9/5044 |
| 2019/0044809 A1* | 2/2019 | Willis | G06F 3/0611 |
| 2021/0117360 A1* | 4/2021 | Kutch | G06F 12/0802 |
| 2021/0281618 A1* | 9/2021 | Mosur | H04L 47/621 |
| 2021/0349820 A1* | 11/2021 | Kutch | G06F 3/0604 |
| 2022/0004399 A1* | 1/2022 | Hsiao | G06N 3/045 |
| 2022/0174005 A1* | 6/2022 | Limaye | H04L 45/38 |
| 2022/0405221 A1* | 12/2022 | Wang | G06N 3/063 |

* cited by examiner

*Primary Examiner* — Henry Tsai
*Assistant Examiner* — Christopher A Bartels
(74) *Attorney, Agent, or Firm* — Quarles & Brady LLP

(57) ABSTRACT

This disclosure describes processes for performing direct memory access ("DMA") between memory of a host and memory of a smart network interface controller ("SNIC") connected to a bus of the host. The host runs a host thread in a processor of the host and the SNIC runs a SNIC thread in a processor of the SNIC. The host thread and the SNIC thread facilitate direct access of the SNIC thread to memory locations in the memory of the host. The SNIC thread can fetch data directly from and/or write data directly to the memory locations of the memory of the host over the bus.

17 Claims, 12 Drawing Sheets

| cmd_ID | Type | Thread |
|---|---|---|
| 0x00 | SNIC offload features list query | Host |
| 0x01 | SNIC hardware resource query 604 | Host |
| 0x02 | SNIC CPU core usage and its workload characterization | Host |
| 0x03 | Host CPU workload query | SNIC |
| 0x04 | VM running on host workload characterization | SNIC |
| 0x05 | Host software offload features list query | SNIC |
| 0x06 | Workload migration request | SNIC/host |
| 0x07 | Software offload or hardware offload reconfiguration request | SNIC/host |

FIG. 6

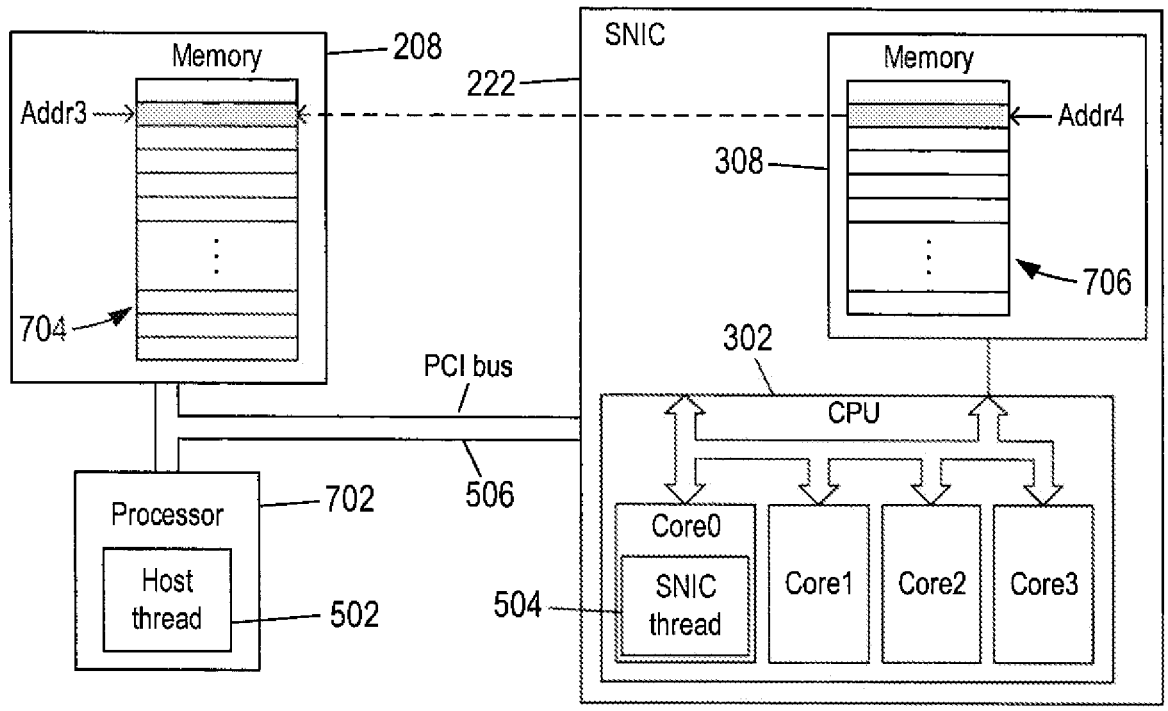
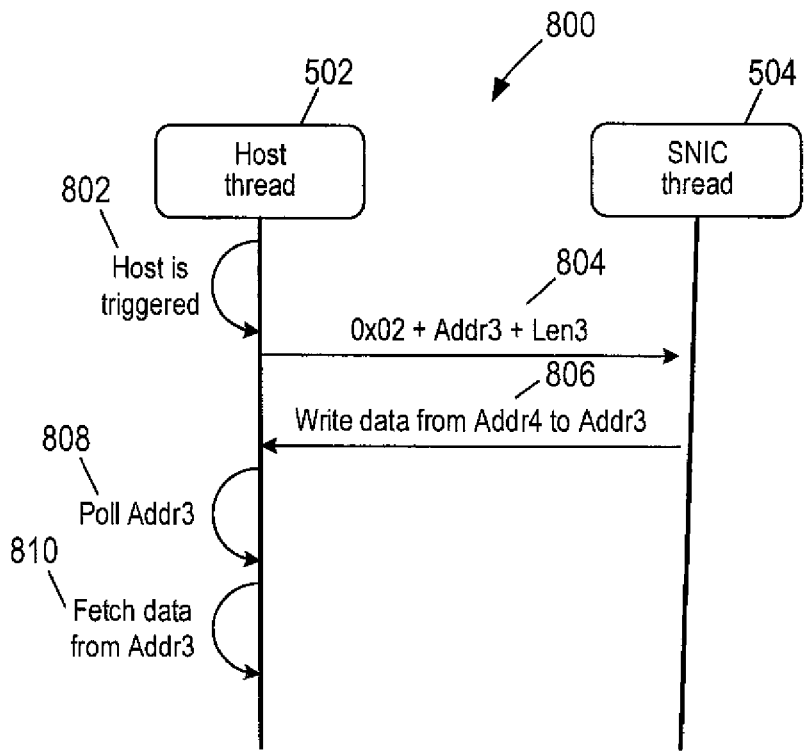
FIG. 8

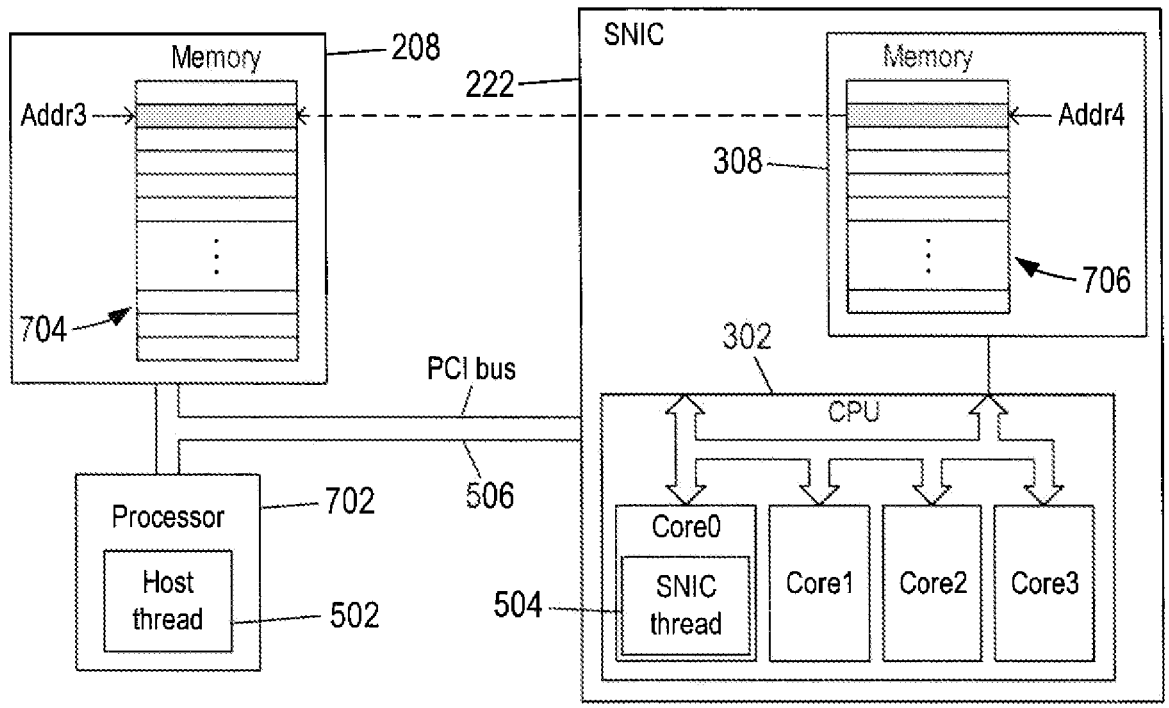
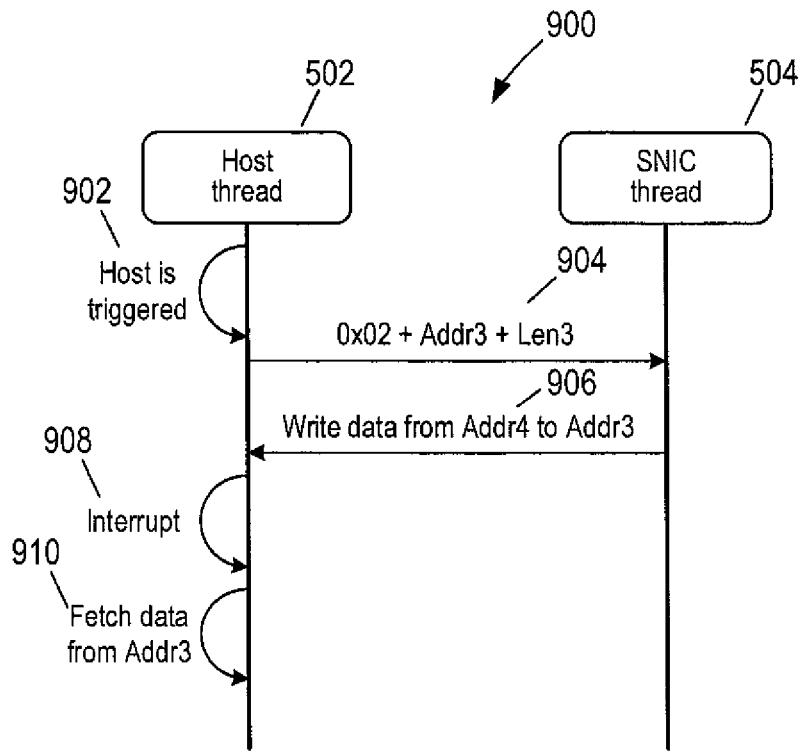
FIG. 9

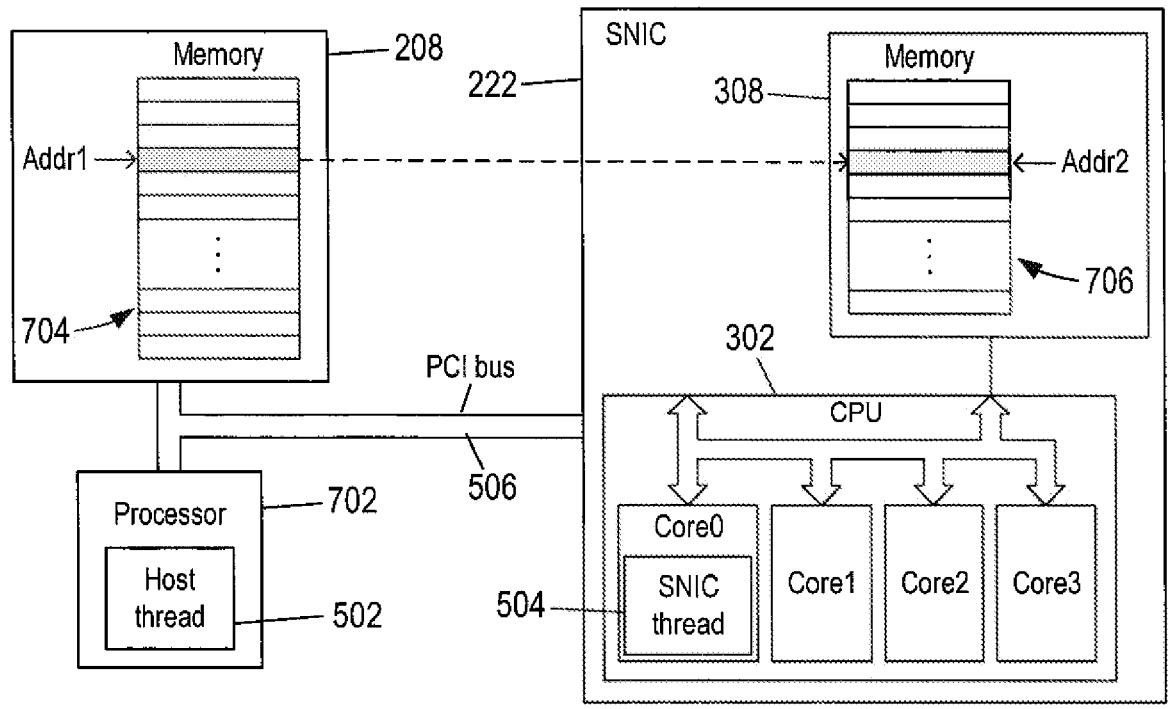
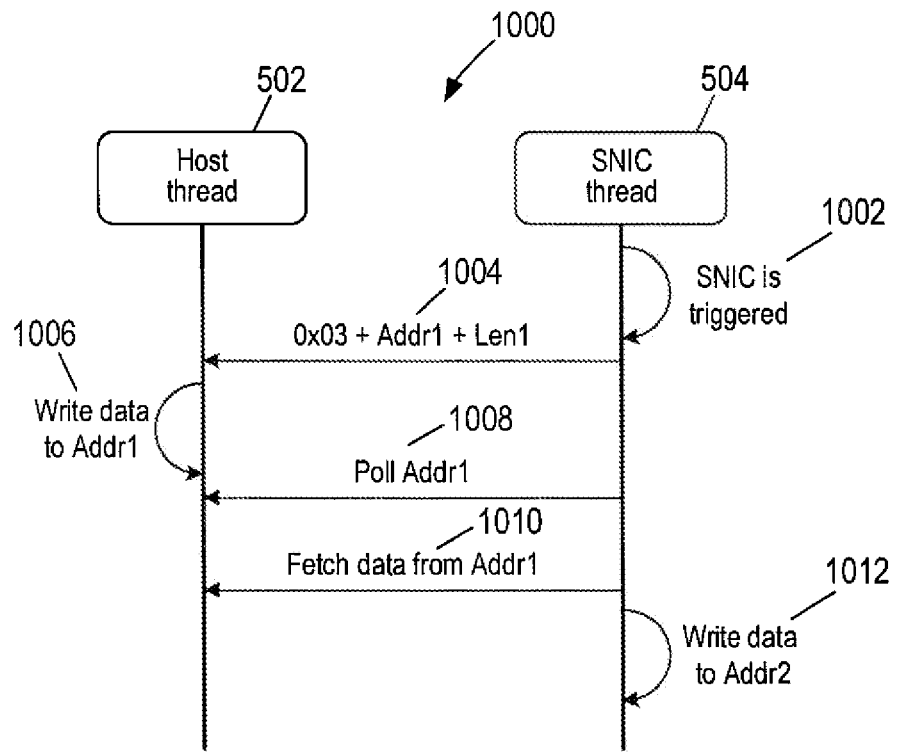
FIG. 10

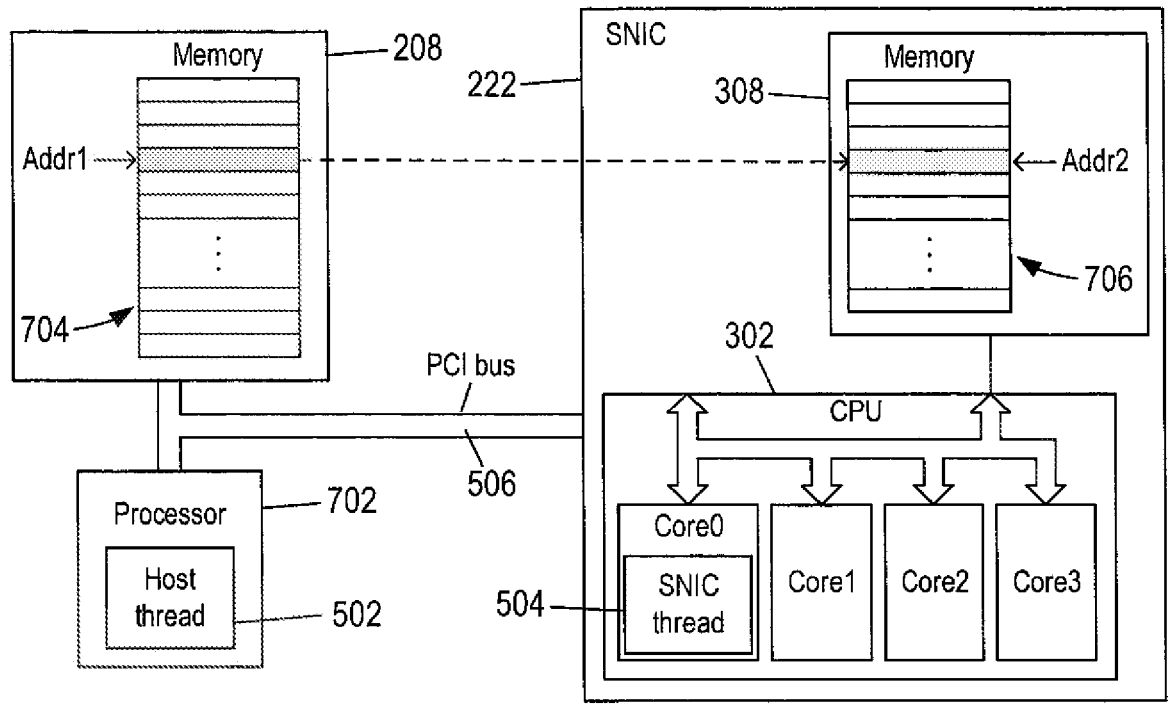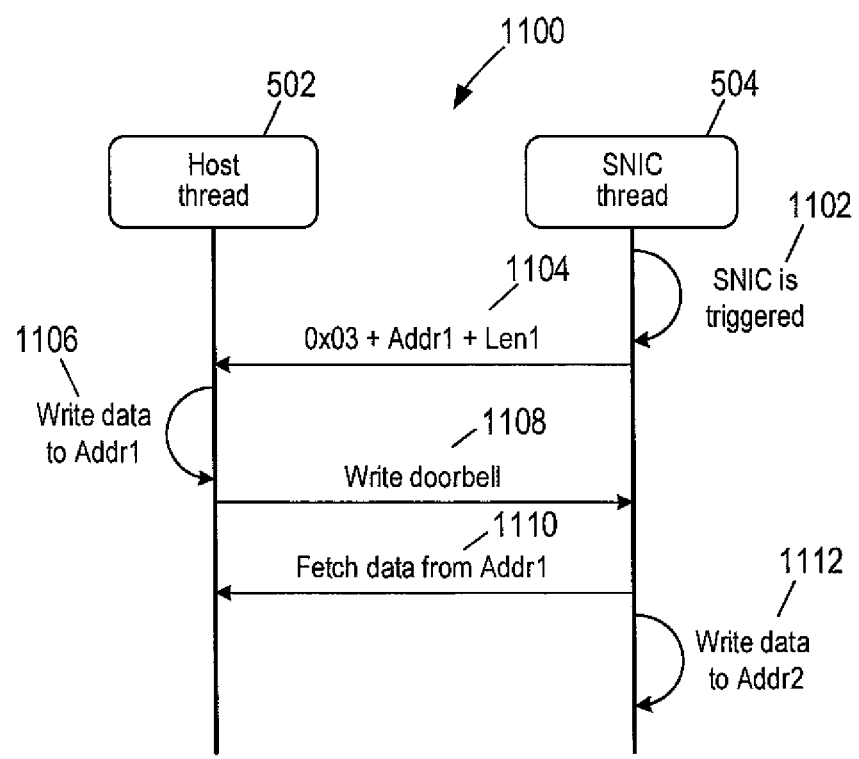
FIG. 11

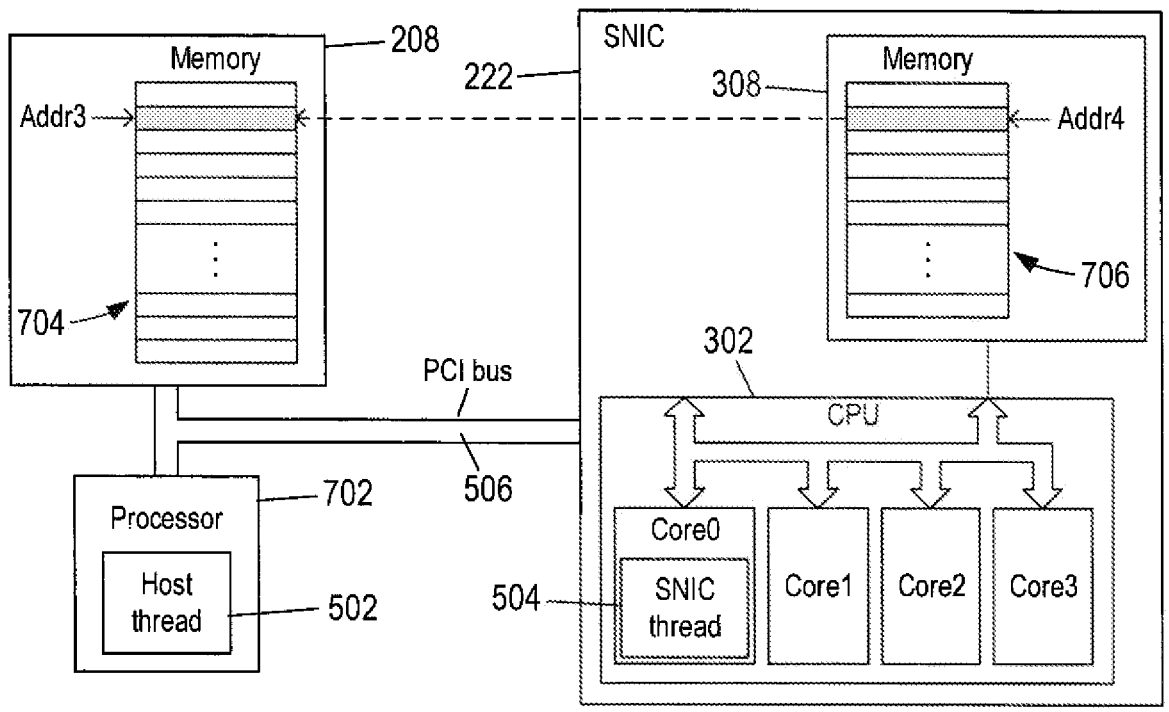
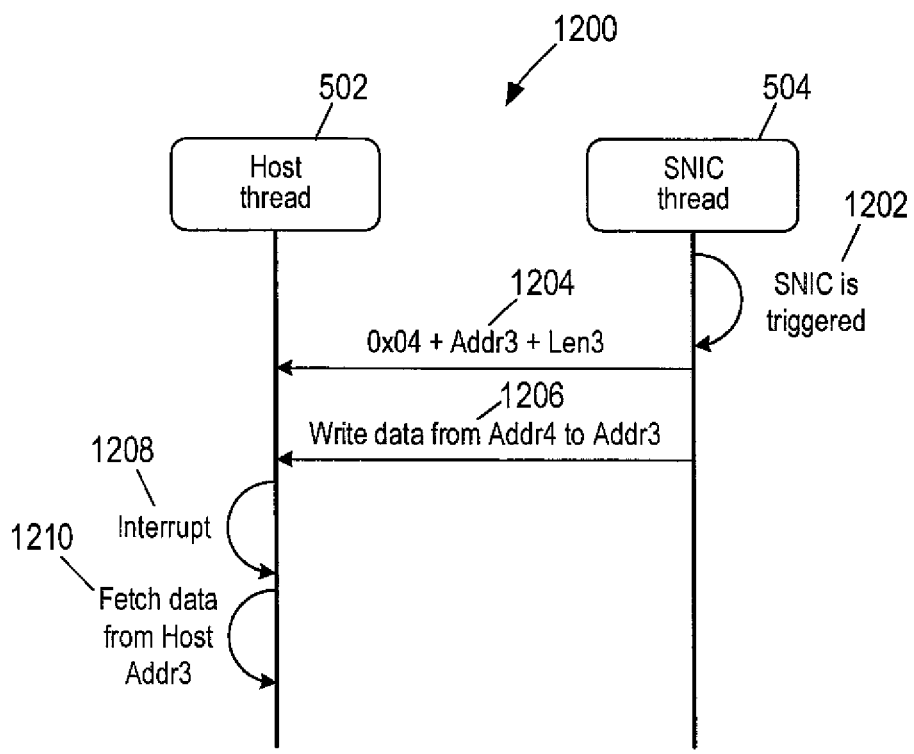
FIG. 12

METHODS AND SYSTEMS FOR ESTABLISHING DIRECT COMMUNICATIONS BETWEEN A SERVER COMPUTER AND A SMART NETWORK INTERFACE CONTROLLER

TECHNICAL FIELD

This disclosure is directed to communication channels between a host and an internal smart network interface controller.

BACKGROUND

Data centers are composed of networked server computers (also called "hosts") and storage appliances that are used to organize, process, and store large amounts of data. Data centers are made possible by advances in virtualization, computer networking, distributed operating systems and applications, data storage appliances, computer hardware, and software technologies. In recent years, an increasing number of enterprises, governments, and other organizations rent processing and data storage services as data center tenants. Data center tenants conduct business and provide cloud services over the internet on platforms that are maintained and run entirely in data centers. For example, data centers have enabled private companies to move data processing and storage to the cloud, thereby reducing the cost of maintaining their centralized computing networks and hosts.

The hosts and data storage appliances are interconnected over a data center network ("DCN") to form a pool of computational and data storage resources for data center tenants. Each host is connected to the DCN via an internal network interface controller ("NIC") that is connected to the bus of the host. In recent years, cloud service providers have embraced NICs with greater functionality to make management and changing of networks easier to manage and less expensive to operate. For example, certain NICs include processors and memory that enable NICs to store and execute operations that were previously performed by the host or by other devices connected to the DCN. However, hosts and programmable NICs have different independent operating systems which create indirect communication between processes running on the host and processes running on the NIC. Conventional approaches for sending data packets between the host and the NIC are indirect. For example, even though the NIC is connected to the internal host bus, data stored in the memory of the host is typically converted into data packets using a networking protocol, the packets are sent to an internal switch of the NIC, and then an operating system of the NIC places the data packets on the DCN. This packet-based method of communication between the NIC and the host memory is indirect and slows the transmission of data packets between the systems of the host and the NIC by failing to take full advantage of the bus connection between the NIC and memory of the host. Datacenter operators and data center tenants seek methods and systems that create direct paths for sending data from the memory of the host to the memory of a NIC.

SUMMARY

This disclosure is directed to processes for performing direct memory access ("DMA") between memory of a host and memory of a smart network interface controller ("SNIC") connected to a bus of the host. The host runs a host thread in a processor of the host and the SNIC runs a SNIC thread in a process or the SNIC. The host thread and the SNIC thread facilitate direct access of the SNIC thread to memory locations in memory of the host. The SNIC thread can fetch data directly from and/or write data directly to the memory locations of the memory of the host over the bus.

DESCRIPTION OF THE DRAWINGS

FIG. 6 shows a table of example command IDs and corresponding request types.

FIGS. 7-12 show flow diagrams that represent different ways in which a host thread and an SNIC thread perform direct memory access.

DETAILED DESCRIPTION

This disclosure presents computer-implemented processes that provide direct memory access ("DMA") between a host and a smart network interface controller ("SNIC") and the host. Processes are executed as a DMA function that creates a bidirectional communication channel between memory of the host and memory of the SNIC.

Figure 1:
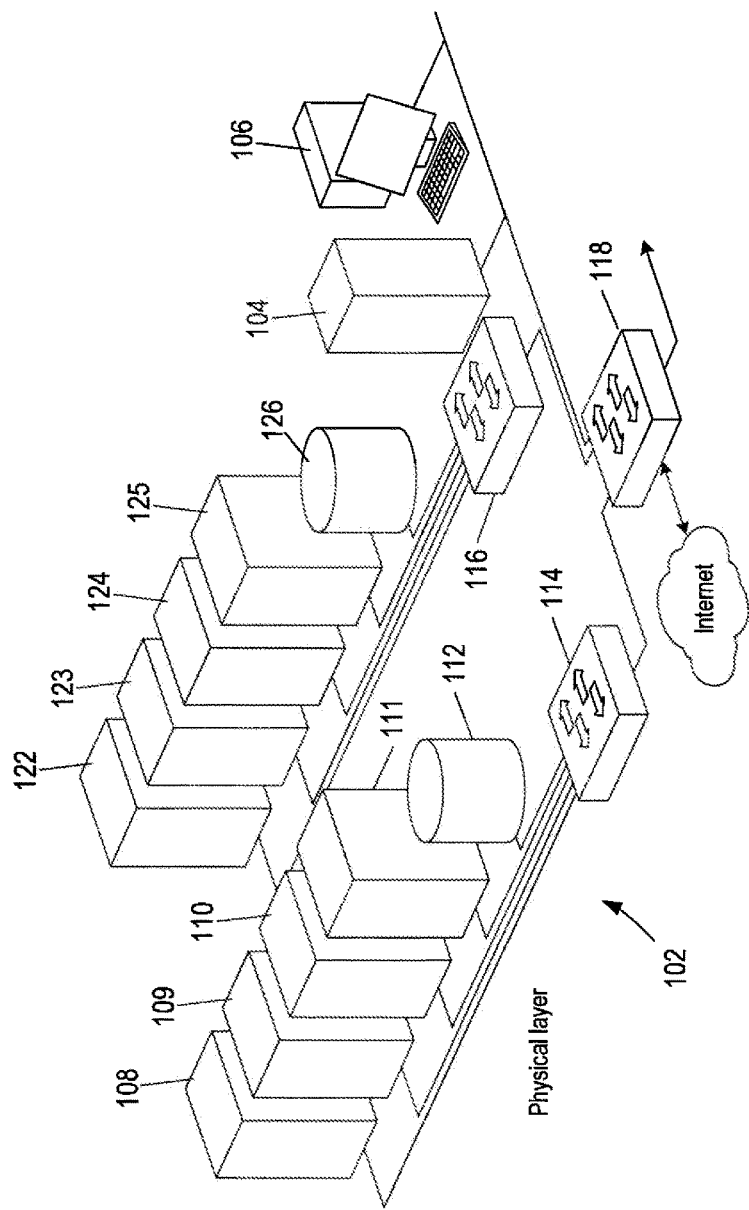
FIG. 1 shows an example of a data center.

FIG. 1 shows an example of a data center 102. The data center 102 comprises a management server computer 104 and any of various computers, such as PC 106, on which a virtual-data-center management user interface may be displayed to system administrators and other users. Objects of the physical data center 102 additionally include server computers, called "hosts," such as hosts 108-111 and 122-125, mass-storage devices 112 and 126, switches 114 and 116, and a top of rack ("TOR") switch 118. In the example of FIG. 1, the switch 114 interconnects the hosts 108-111 and mass-storage devices 112, and the switch 116 interconnects the hosts 122-125 and the mass-storage devices 126. The TOR switch 118 interconnects the hosts 108-111 to the hosts 122-125, the internet, the virtual-data-center management server 104, the PC 106, and other server computers and mass-storage appliances of the data center (not shown). Physical data centers may include a multitude of hosts, data storage devices, networking components, and devices connected according to many different types of connection topologies.

Figure 2:
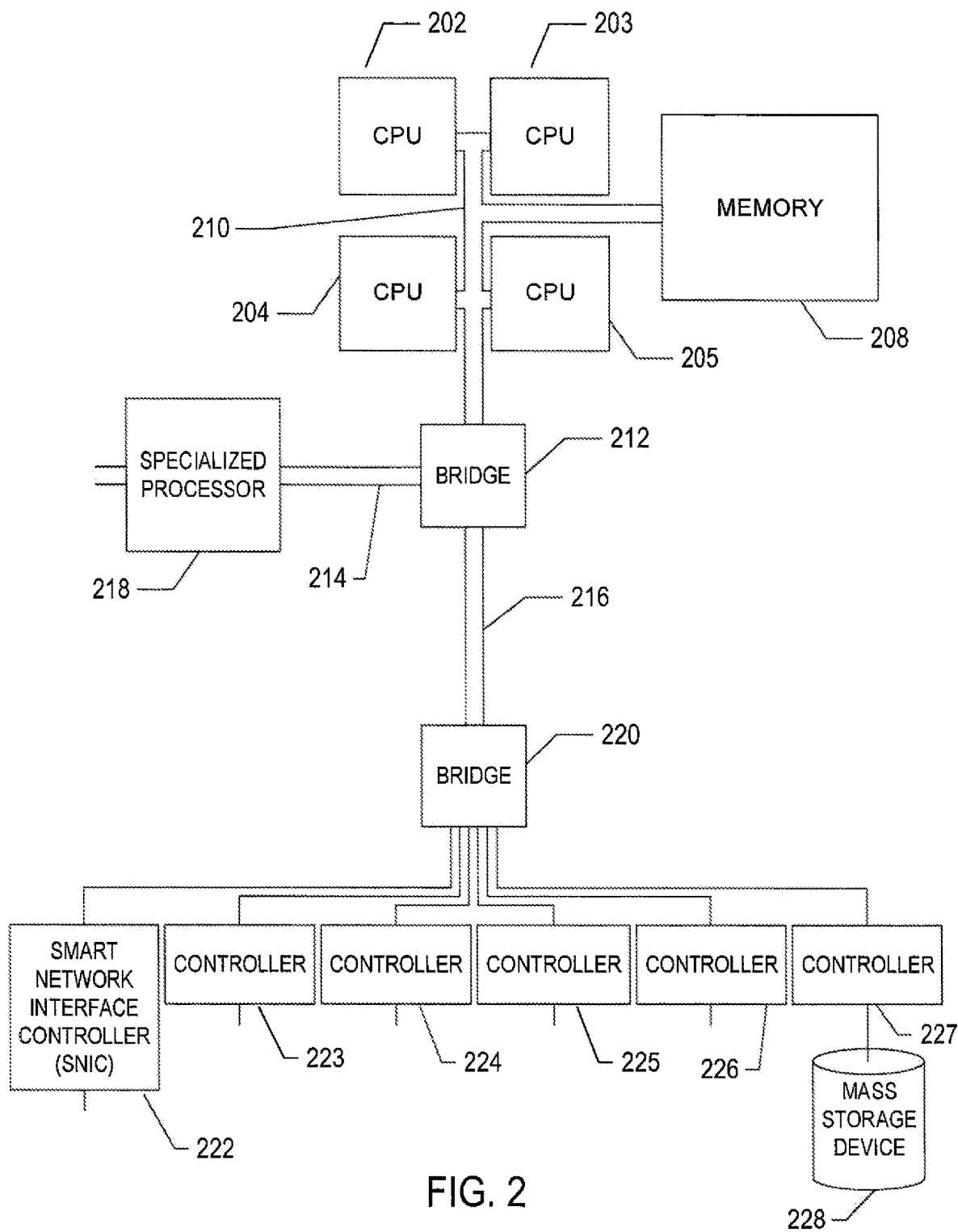
FIG. 2 shows an example architecture of a host that contains a smart network interface controller ("SNIC").

FIG. 2 shows an example architecture of a host that contains an SNIC. The host contains multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. The busses or serial interconnections, in turn, connect the CPUs and memory with specialized processors, such as a graphics processor 218, and with one or more additional bridges 220, which are interconnected to a SNIC 222, and multiple controllers 223-227. The controllers 222-227 are connected to the bridge 220 with high-speed serial links, such as peripheral component interconnect ("PCI") busses or PCI express ("PCIe") serial expansion busses. The controllers 223-227 are expansion cards that interface with different types of peripheral devices. The SNIC 222 is a component that connects the host to a DCN as shown in FIG. 1. An example implementation of the SNIC 222 is described below with reference to FIG. 4. The controller 227 interfaces with a computer-readable medium 328. The other controllers 223-226 can interface with electronic displays, input devices, and other such components, subcomponents, and computational resources. The electronic displays, including a visual display screen, audio speakers, and other output interfaces, and the input devices, including mice, keyboards, touch screens, and other such input interfaces, together constitute input and output interfaces that allow the host to interact with human users. The computer-readable medium 228 is a data-storage device, including electronic memory, optical or magnetic disk drive, a magnetic tape drive, USB drive, flash memory and other such data-storage device.

Figure 3:
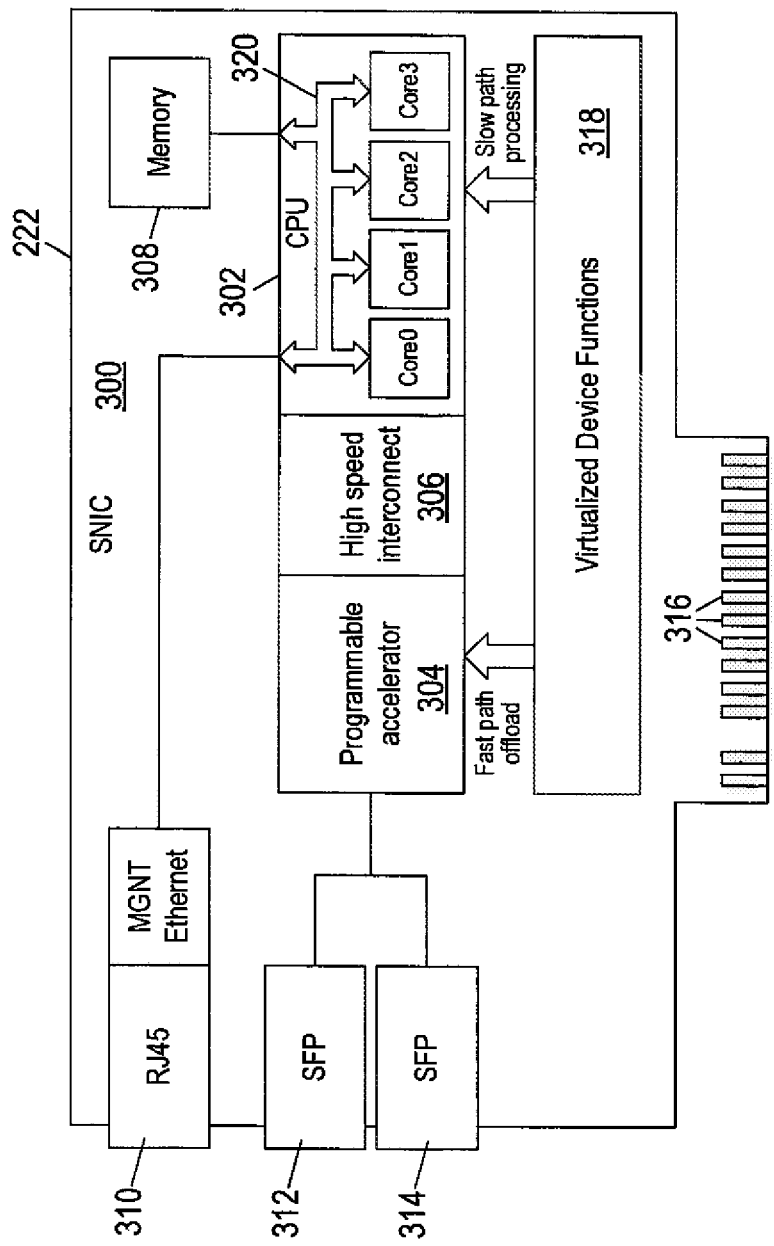
FIG. 3 shows an example architecture of the SNIC of the host shown in FIG. 2.

FIG. 3 shows an example architecture of the SNIC 222 shown in FIG. 2. The SNIC 222 comprises a CPU 302 that is connected to a programmable accelerator 304 via a high-speed interconnect 306 mounted on a printed circuit board 300. The SNIC 222 includes memory 308 that is mounted on the circuit board 300 and connected to the CPU 302. In this example, the CPU 302 is connected to an RJ45 modular ethernet connector 310. The programmable accelerator 304 is connected to two small form-factor pluggable ("SFP") connectors 312 and 314 that may be used to connect with fiber-optic cables. The circuit board 300 includes an array of pins 316 that are inserted into an electrical connector, such as an expansion slot, of a motherboard of the host. The SNIC 222 includes non-volatile memory that stores virtual device functions 318, such as a virtual network adapter that provides high performance in virtual machines ("VMs") running on the SNIC 222. In this example, the CPU 302 comprises four cores, denoted by core0, core1, core2, and core3, that are connected by a bus interface 320. The SNIC 222 is not limited to a CPU with just four cores. In other implementations, the CPU 302 may contain as few as two cores. While in still other implementations the CPU 302 may contain more than four cores.

Virtualization has made a major contribution to enterprises, governments, and other organizations moving data processing and data storage services to data centers. Virtualization provides for the creation of software-based, or virtual, representations of server computers, data-storage devices, and networks. For example, a virtual computer system, known as a virtual machine ("VM"), is a self-contained application and operating system implemented in software. Software components of a distributed application may be executed separately in VMs. A VM may be created or destroyed on demand and may be migrated from one physical server computer to another in a data center. Virtualization has enabled scaling of distributed applications and distributed computing systems to meet changing user demand.

Figure 4:
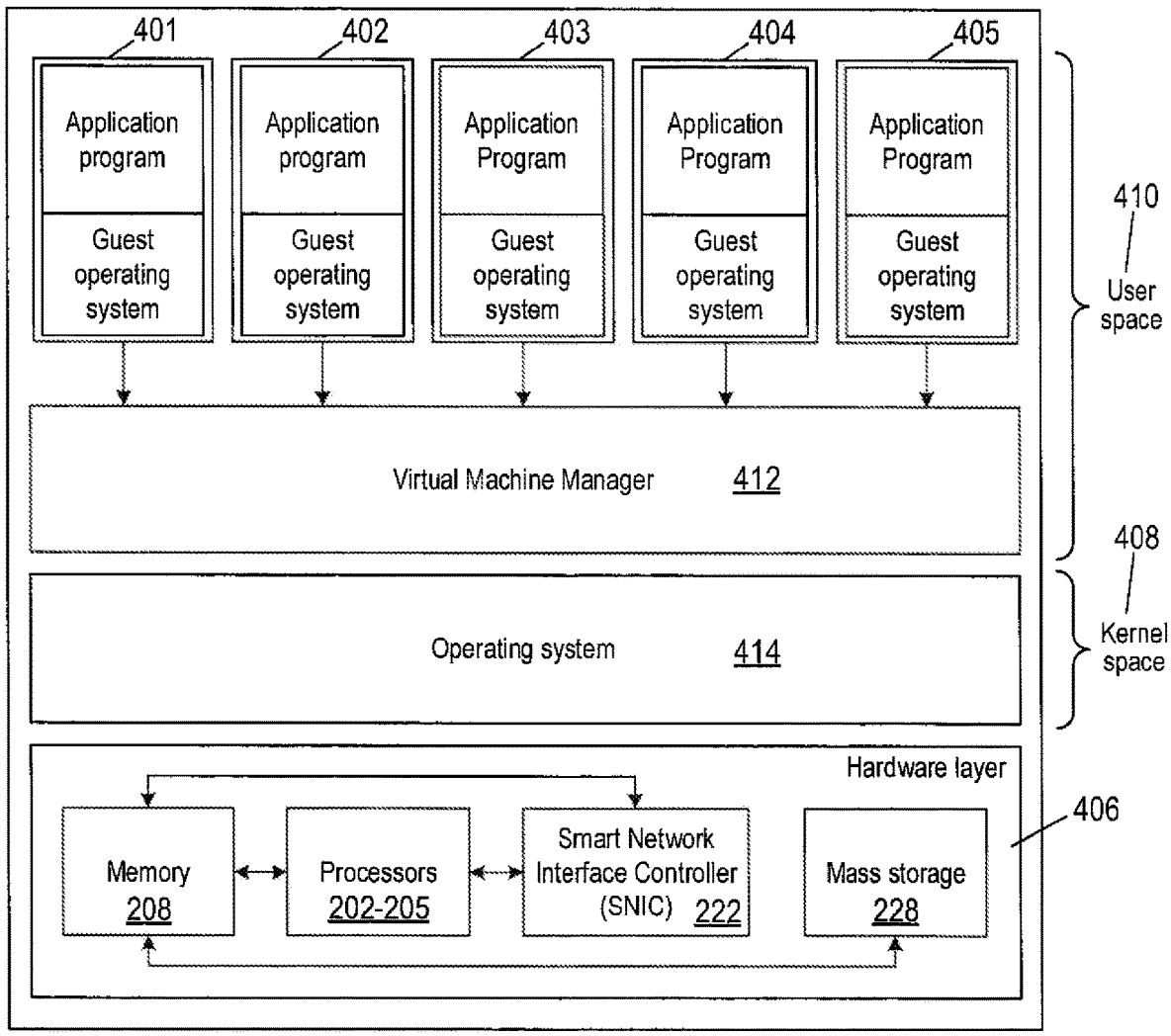
FIG. 4 shows an example architecture of the host in FIG. 2 used to run applications in virtual machines.

FIG. 4 shows an example the host used to run applications in VMs. In this example, the host runs five VMs 401-405. The host includes a hardware layer 406, a kernel space 408, and a user space 410. The hardware layer 406 includes the processors 202-205, memory 208, SNIC 222, and mass-storage device 228. The hardware layer also includes other components (not shown), such as power supplies, internal communication links and busses, specialized integrated circuits, many different types of processor-controlled or microprocessor-controlled peripheral devices and other controllers identified in FIG. 2. Each VM includes an application program or other higher-level computational entities packaged together with a guest operating system that interfaces with a virtual machine manager ("VMM") 412 that runs on the host operating system 414. The VMM 412 virtualizes the physical processors and memory in the hardware layer 406 to create virtual processors, virtual memory, and a virtual network that are available to the VMs 401-405.

Processes provide DMA between memory of the host and memory of the internal SNIC connected to the PCI bus of the host by creating a bidirectional communication channel via the PCI bus of the host. In other words, the processes described below give the SNIC DMA to the memory of the host and give the host DMA of memory of the SNIC. The DMA processes are executed with one or more threads running on the host and a thread running on SNIC. Each thread is a sequence of instructions that executes a sequential flow of control for facilitating DMA between the memory of the host and the memory of the SNIC.

Figure 5:
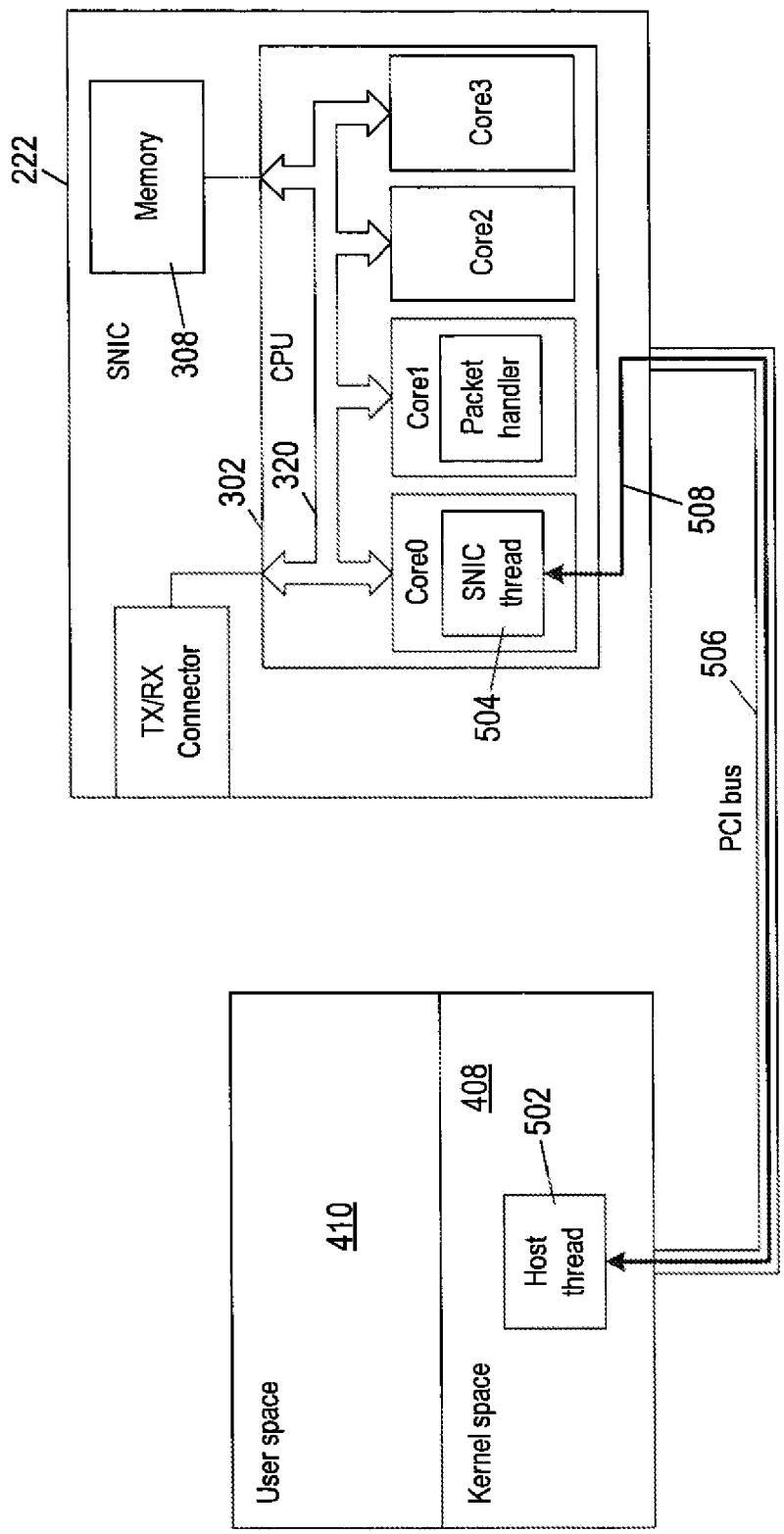
FIG. 5 shows an example a host thread that runs a host thread and an SNIC that runs an SNIC thread for direct memory access over a PCI bus that connects the SNIC to memory of the host.

FIG. 5 shows an example of a host thread 502 running in the kernel space 408 of the host and an SNIC thread 504 running in core0 of the CPU 302 of the SNIC 222. Host thread 502 is an independent set of instructions that are part of a process (e.g., operating system) running in the kernel space of the host. For example, host thread 502 may run in a separate kernel module of kernel space 408. Alternatively, the host thread 502 may be a thread of the SNIC driver that runs in the kernel space 408. SNIC thread 504 is another independent set of instructions that are part of a process running a core of the SNIC 222. The host thread 502 and the SNIC thread 504 perform DMA between the memory or the host and the memory of the SNIC 222 over the PCI bus 506. For example, the host may be running a multithreaded process (i.e., computer program) on the cores 202-205 with the host thread 504 running in one of the cores 202-205 while the SNIC thread 504 runs in core0 of the CPU 302. The host thread 502 and the SNIC thread 504 perform DMA between the memory 208 of the host and the memory 308 of the SNIC 222 over the PCI bus 506 of the host as indicated by double-headed directional arrow 508.

Each request for DMA executed by the host thread 502 and the SNIC thread 504 is initiated by a DMA command with a format given by $$cmd\_ID+memory\_address+length$$

The host and the SNIC 222 use a control path to send the DMA command read and write data to memory locations. For example, the control path can be a memory-mapped I/O ("MMIO"), V/O register, or a Virt-I/O control queue. The command identification ("ID"), cmd_ID, identifies the type of request for data that is executed by the host or by the SNIC 222 when executing the command. FIG. 6 shows a table of example command IDs and request types associated with each command. For example, a command ID "0x01" 602 is an "SNIC hardware resource query" 604 type of request. Certain commands are only sent from the SNIC thread 504 to the host thread 502, other commands are only sent from the host thread 502 to the SNIC thread 502, and other commands can be sent by the host thread 502 and the SNIC thread 502. Column 606 identifies the thread that sends the corresponding command ID. For example, SNIC thread 608 sends the command ID "0x01" 602. The "memory_address" is a specific sequence of digits that refers to a specific location in the memory 208 of the host or the memory 308 of the SNIC 222. The "length" refers to the amount of data, such as the number of bytes, to be read or written at the memory address. When the SNIC thread 504 or the host thread 502 receives a DMA command, the threads use the length to determine how much space is needed to write data to the memory address or how much data to read from the memory address.

The Host uses the host thread 502 to perform migration or reconfiguration requests sent by the SNIC thread 504. The SNIC 222 uses SNIC thread 504 to perform migration or reconfiguration requests sent by the host thread 502. The raw data transferred by DMA operations performed by the host thread 502 and the SNIC thread 504 has the following form:

request_DMA_sequence_number+request_type+data_type+content

The "request_DMA_sequence_number" is a tag applied to each request for data. The "request_type" corresponds to command ID entries in the table of FIG. 6. For example, if the command ID is "0x00" in the command sent by one of the host or SNIC threads then the request type in the raw data transferred by DMA is "SNIC offload features list query." The "data type" identifies the type of data transferred by DMA between the host and the SNIC as character data, numerical data, or string data. The "content" is the data that is transferred by DMA.

FIGS. 7-12 show examples of operations performed by the host thread 502 and the SNIC thread 504 to complete DMA of memory locations in the memory 308 of the SNIC 222 and memory locations in the memory 208 of the host using a PCI bus. A processor 702 represents one of the processors 202-205 in FIG. 2. Addressed memory locations in the memory 208 are represented by rectangles 704 and addressed memory locations in the memory 308 of the SNIC 222 are represented by rectangles 706.

Figure 7:
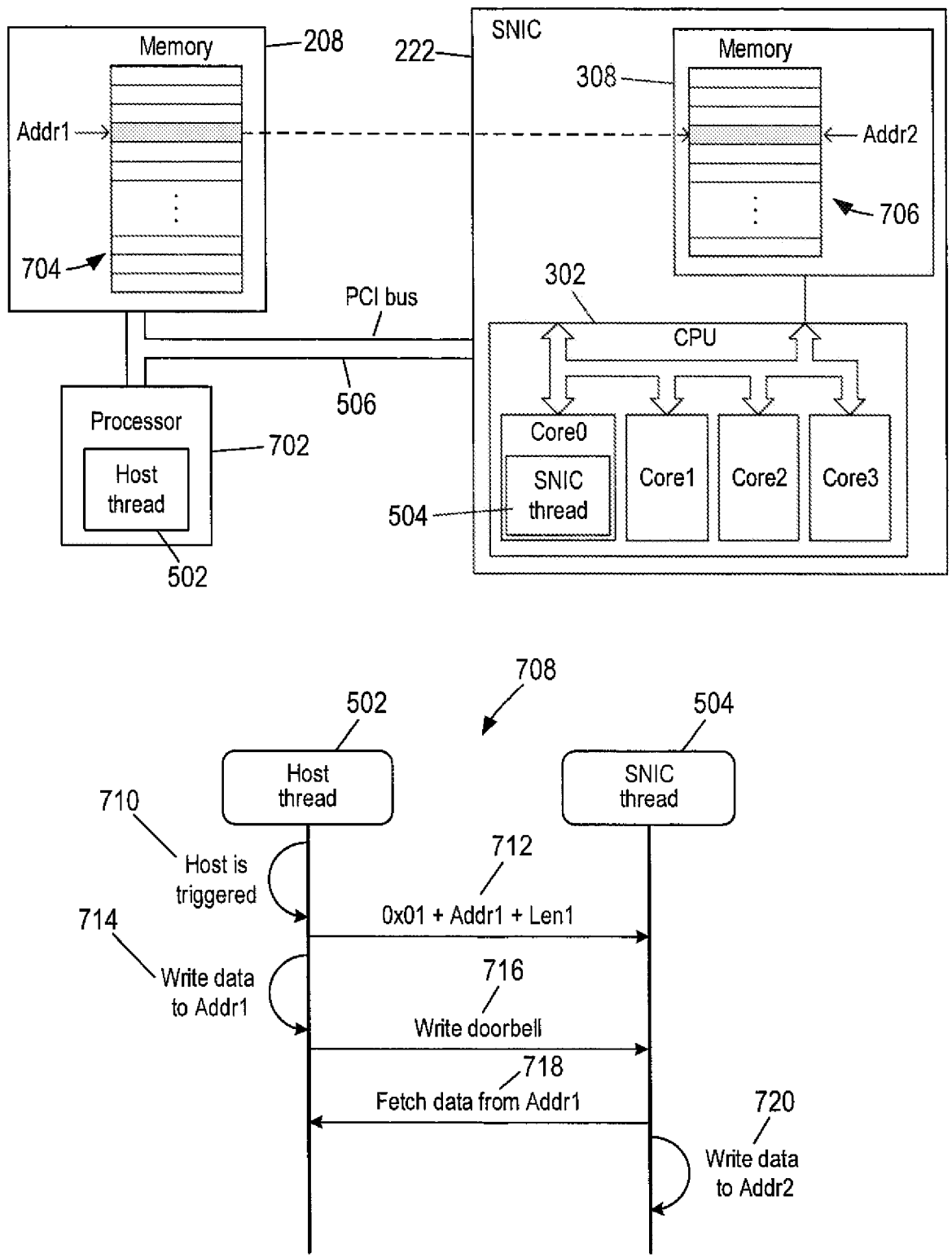

FIG. 7 shows a flow diagram 708 of operations performed by the host thread 502 and the SNIC thread 504 to write data directly from the "Addr1" memory location of memory 208 to the memory 308. In this example, the host is triggered 710, or activated, to send data to the SNIC. The host thread 502 sends a DMA command 712 to the SNIC thread 504. The host thread 502 writes 714 the data to be sent to the SNIC 222 in the "Addr1" memory location in the memory 208. The host thread 502 writes a doorbell 716 to a doorbell register of the SNIC 222. The doorbell is confirmation to the SNIC thread 504 that host thread 502 has written the data to the "Addr1" memory location identified in the DMA command. The SNIC thread 504 fetches 718 data directly from the "Addr1" memory location. The SNIC 504 writes 720 the data to "Addr2" memory location of the memory 308.

FIG. 8 shows a flow diagram 800 of operations performed by the host thread 502 and the SNIC thread 504 to write data directly from the memory 308 to the "Addr3" memory location in the memory 208. In this example, the host thread 504 is triggered 802 to retrieve data from the memory 308 and sends 804 a DMA command that identifies the "Addr3" memory location in the memory 208 as the memory location for receiving data stored in the memory 308. The SNIC thread 504 responds to the DMA command by writing 806 data from "Addr4" memory location directly to the "Addr3" memory location. The host thread 502 actively polls 808 the "Addr3" memory location to determine whether data has been stored at the "Addr3" memory location. If data has been stored at the "Addr3" memory location, the host thread 502 fetches 810 the data from the "Addr3" memory location for processing by another thread or for storage in the mass storage device 228.

FIG. 9 shows a flow diagram 900 of operations performed by the host thread 502 and the SNIC thread 504 to write data directly from the memory 308 to the "Addr3" memory location in the memory 208. In this example, the host thread 504 is triggered 902 and sends 904 a DMA command that identifies the "Addr3" memory location 806 in the memory 208 as the memory location for receiving data stored in the memory 308. The SNIC thread 504 responds to the DMA command by writing 906 data from the "Addr4" memory location 810 directly to the "Addr3" memory location 806. The host thread 502 interrupts 908 the processor 702, which allows the host thread 502 to fetch 910 the data from the "Addr3" memory location 806 for processing by another thread or for storage in the mass storage device 228.

FIG. 10 shows a flow diagram 1000 of operations performed by the host thread 502 and the SNIC thread 504 to fetch data directly from the "Addr1" memory location in the memory 208 and write the data to the memory 308. In this example, the SNIC 222 is triggered 1002, or activated, to get data from the host. The SNIC thread 504 sends 1004 a DMA command that identifies the "Addr1" memory location in the memory 208. The host thread 502 responds to the request by writing 1006 data to the "Addr1" memory location. The SNIC thread 504 actively polls 1008 the "Addr1" memory location to determine whether the host thread 504 has written data to the "Addr1" memory location. If data has been written at the "Addr1" memory location, the SNIC thread 504 fetches 1010 the data from the "Addr1" memory location and writes 1012 the data to the "Addr2" memory location in the memory 308. The data stored at the "Addr2" memory location can be sent to a packet handler running in core1. The packet handler packetizes the data and sends the data to another host in the data center or to another computer device on the internet.

FIG. 11 shows a flow diagram 1100 of operations performed by the host thread 502 and the SNIC thread 504 to fetch data directly from the "Addr1" memory location in the memory 208 and write the data to the memory 308. In this example, the SNIC 222 is triggered 1102, or activate, to get data from the host. The SNIC thread 504 sends 1104 a DMA command that identifies the "Addr1" memory location in the memory 208. The host thread 502 responds to the request by writing data 1006 to the "Addr1" memory location. The host thread 502 writes a doorbell 1108 to a doorbell register of the SNIC 222, triggering the SNIC thread 504 to fetch 1110 the data stored in the "Addr1" memory location. The SNIC thread 504 fetches 1110 the data from the "Addr1" memory location and writes 1112 the data to the "Addr2" memory location in the memory 308. The data at the "Addr2" memory location can be sent to a packet handler running in core1. The packet handler packetizes the data and sends the data to another host in the data center or to another computer device on the internet.

FIG. 12 shows a flow diagram 1200 of operations performed by the host thread 502 and the SNIC thread 504 to write data directly from the memory 308 to the "Addr3" memory location in the memory 208. In this example, the SNIC 222 is triggered 1102 to write data directly to the memory 208 of the host. The SNIC thread 504 sends 1104 a DMA command that identifies the "Addr3" memory location in the memory 208. The SNIC thread 504 writes 1106 fetches the data in "Addr4" memory location and writes 1106 the data directly to the "Addr3" memory location. The host thread 502 interrupts 1108 the processor 702, which allows the host thread 502 to fetch 1110 the data from the "Addr3" memory location for processing by another thread or for storage in the mass storage device 228.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. Apparatus for performing direct memory access ("DMA") between memory of a host and memory of a smart network interface controller ("SNIC") connected to a bus of the host, the apparatus comprising:
   a host thread running in a processor of the host for fetching data directly from and writing data directly to the memory of the SNIC over the bus using a first memory address of the memory of the SNIC, the host thread being configured to send a DMA command to the SNIC, the DMA command including a command ID that requests resource allocation for a virtual device function stored in a memory of the SNIC; and
   a SNIC thread running in a processor of the SNIC for fetching data directly from and writing data directly to the memory of the host over the bus using a second memory address of the memory of the host, the SNIC thread being configured to, upon completing a data transfer operation, write a completion flag to the memory location or status register with the virtual device function, and to interrupt the host processor to signal completion of the operation.

2. The apparatus of claim 1 wherein the host thread running in the processor of the host for writing data directly to the memory of the SNIC comprises:
   sends a DMA command to the SNIC thread that identifies a memory location of the memory of the host;
   writes data to the memory location; and
   writes a doorbell to a doorbell register of the SNIC, the doorbell indicating data has been written to the memory location.

3. The apparatus of claim 1 wherein the SNIC thread running in a processor of the SNIC for fetching data directly from the memory of the host comprises:
   receives a doorbell in a doorbell register of the SNIC, the doorbell indicating data has been written to a memory location in the memory of the host;
   fetches the data stored in the memory location; and
   writes the data to a memory location in the memory of the SNIC.

4. The apparatus of claim 1 wherein the host thread running in the processor of the host for fetching data directly from the memory of the SNIC comprises:
   sends a DMA command to the SNIC thread that identifies a memory location of the memory of the host and directs the SNIC thread to write data to the memory location;
   polls the memory location to determine whether data has been written to the memory location; and
   fetches data from the memory location in response to detecting data stored at the memory location.

5. The apparatus of claim 1 wherein the host thread running in the processor of the host for fetching data directly from the memory of the SNIC comprises:
   sends a DMA command to the SNIC thread that identifies a memory location of the memory of the host and directs the SNIC thread to write data to the memory location;
   interrupts the processor of the host; and
   fetches data from the memory location in response to detecting data stored at the memory location.

6. The apparatus of claim 1 wherein the SNIC thread running in the processor of the SNIC for writing data directly to the memory of the SNIC comprises:
   sends a DMA command to the host thread that identifies a memory location of the memory of the host;
   receives a doorbell from the host thread in a doorbell register of the SNIC, the doorbell indicating data has been written to a memory location in the memory of the host;
   fetches data stored in the memory location in the memory of the host; and
   writes the data to a memory location in the memory of the SNIC.

7. The apparatus of claim 1 wherein the host thread running in a processor of the host for writing data directly from the memory of the host comprises:
   receives a DMA command from the SNIC thread that identifies a memory location of the memory of the host;
   writes data to the memory location in the memory of the host; and
   sends a doorbell to a doorbell register of the SNIC, the doorbell indicating data has been written to the memory location.

8. The apparatus of claim 1 wherein the SNIC thread running in the processor of the SNIC for fetching data directly from the memory of the host comprises:
   sends a DMA command to the host thread that identifies a memory location of the memory of the host and directs the host thread to write data to the memory location;
   polls the memory location to determine whether data has been written to the memory location;
   fetches the data from the memory location in response to detecting the data stored at the memory location; and
   writes the data to a memory location in the memory of the SNIC.

9. The apparatus of claim 1 wherein the SNIC thread running in the processor of the SNIC for writing data directly from the memory of the host comprises:
   sends a DMA command to the host thread that identifies a memory location in the memory of the host; and
   writes data direct to the memory location in the memory of the host.

10. The apparatus of claim 1 wherein the host thread running in the processor of the host for fetching data directly from the memory of the SNIC comprises:
    interrupts the processor of the host; and
    fetches data from the memory location in the memory of the host.

11. The apparatus of claim 1, wherein the host thread is configured to send a DMA command that identifies a memory location in the SNIC, the DMA command being sent using a memory-mapped I/O (MMIO) region.

12. A method for performing direct memory access ("DMN") to memory of a host by a smart network interface controller ("SNIC") connected to a bus of the host, the method comprising:
    sending a DMA command from a host thread that runs in a processor of the host to an SNIC thread that runs in a processor of the SNIC, the DMA command identifying a memory location in the memory of the host using a first memory address of the memory of the SNIC;

writing data from the memory of the SNIC into the memory location in the memory of the host by the SNIC thread using a second memory address of the memory of the host;

sending a DMA command to the SNIC, the DMA command including a command ID that requests resource allocation for a virtual device function stored in a memory of the SNIC fetching the data from the memory location in the memory of the host by the host thread;

writing a completion flag to the memory location or status register with the virtual device function, and;

interrupting the host processor to signal completion of the operation.

13. The method of claim 12 further comprising polling the memory location in the memory of the host by the host thread.

14. The method of claim 12 further comprising interrupting the processor of the host.

15. A method for performing direct memory access ("DMA") to memory of a host by a smart network interface controller ("SNIC") connected to a bus of the host, the method comprising:

receiving a DMA command at a host thread that runs in a processor of the host, the DMA command generated by an SNIC thread that runs in a processor of the SNIC and identifies a memory location in the memory of the host, the DMA command including a command ID that requests resource allocation for a virtual device function stored in a memory of the SNIC;

the host thread writing data to the memory location;

the SNIC thread fetching the data from the memory location using a memory address of the memory of the host; and the SNIC thread writing the data to a memory location in memory of the SNIC;

the SNIC thread, upon completing a data transfer operation, writing a completion flag to the memory location or status register with the virtual device function, and interrupting the host processor to signal completion of the operation.

16. The method of claim 15 further comprising the host thread sending a doorbell to a doorbell register of the SNIC.

17. The method of claim 15 further comprising the SNIC thread polling the memory location in the memory of the host.

* * * * *